US012401954B2

(12) United States Patent
Degani et al.

(10) Patent No.: US 12,401,954 B2
(45) Date of Patent: Aug. 26, 2025

(54) COMMUNICATION DEVICE, HEARING AID SYSTEM AND COMPUTER READABLE MEDIUM

(71) Applicant: Intel Corporation, Santa Clara, CA (US)

(72) Inventors: Ofir Degani, Haifa (IL); Arnaud Pierres, Cupertino, CA (US); Oren Haggai, Kefar Sava (IL); David Birnbaum, Modiin (IL); Amy Chen, San Jose, CA (US); Revital Almagor, Moshav Beit Oved (IL); Darryl Adams, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 17/560,318

(22) Filed: Dec. 23, 2021

(65) Prior Publication Data

US 2023/0209281 A1 Jun. 29, 2023

(51) Int. Cl.
*H04R 25/00* (2006.01)

(52) U.S. Cl.
CPC ......... *H04R 25/507* (2013.01); *H04R 25/554* (2013.01); *H04R 25/70* (2013.01); *H04R 2225/55* (2013.01)

(58) Field of Classification Search
CPC .... H04R 25/507; H04R 25/554; H04R 25/70; H04R 2225/55
See application file for complete search history.

(56) References Cited

U.S. PATENT DOCUMENTS

| | | | | |
|---|---|---|---|---|
| 5,721,783 A * | 2/1998 | Anderson | H04M 1/72421 381/328 |
| 9,251,805 B2 * | 2/2016 | Aratsu | G10L 21/0208 |
| 10,510,446 B2 * | 12/2019 | Westermann | G16H 10/65 |
| 10,848,881 B2 * | 11/2020 | Fitz | H04R 25/554 |
| 2005/0180578 A1 | 8/2005 | Cho et al. | |

(Continued)

FOREIGN PATENT DOCUMENTS

| | | |
|---|---|---|
| KR | 101630067 B1 | 6/2016 |
| WO | 2021151771 A1 | 8/2021 |

OTHER PUBLICATIONS

International Search Report issued for the corresponding PCT patent application No. PCT/US2022/080284, dated Mar. 16, 2023, 3 pages (For informational purposes only).

(Continued)

*Primary Examiner* — Brian Ensey
(74) *Attorney, Agent, or Firm* — Viering, Jentschura & Partner mbB

(57) ABSTRACT

A communication device is provided including at least one processor coupled between a wireless communication terminal interface and an audio source; and a memory having a personal audibility feature (PAF) file stored therein and coupled to the processor, wherein the processor is configured to provide an audio stream to the wireless communication terminal interface based on a processed audio signal, determined using the audio source, wherein the processing corresponds to the information stored in the PAF file, the PAF file comprising personal auditability feature of a predetermined user and an audio reproduction feature of a predetermined terminal hearing device.

25 Claims, 6 Drawing Sheets

(56) References Cited

U.S. PATENT DOCUMENTS

| | | | |
|---|---|---|---|
| 2017/0188151 | A1 | 6/2017 | Veeramani et al. |
| 2017/0206057 | A1 | 7/2017 | Lee et al. |
| 2020/0236457 | A1 | 7/2020 | Akaike et al. |
| 2023/0073568 | A1 | 3/2023 | Laaksonen et al. |

OTHER PUBLICATIONS

Wikipedia; "Hearing Loss"; https://en.wikipedia.org/wiki/Hearing_loss; retrieved on Nov. 24, 2021; 26 pages.
Wikipedia; "Equal-loudness contour"; https://en.wikipedia.org/wiki/Equal-loudness_contour; retrieved on Nov. 24, 2021; 6 pages.
Wikipedia; "Noise-induced hearing loss"; https://en.wikipedia.org/wiki/Noise-induced_hearing_loss; retrieved on Nov. 24, 2021; 32 pages.

* cited by examiner

COMMUNICATION DEVICE, HEARING AID SYSTEM AND COMPUTER READABLE MEDIUM

TECHNICAL FIELD

This disclosure generally relates to hearing aid systems.

BACKGROUND

According to the World Health Organization (WHO) one in five people in the world today experience some level of hearing loss (slight to profound). Nearly 80% of people with hearing loss live in low to middle income countries. Hearing aids with Bluetooth capabilities are gaining popularity. These devices connect seamlessly to phones and other Bluetooth (BT)-enabled Internet of Things (IoT)/Wearable devices.

Hearing aids supporting the new Bluetooth Low Energy (BT LE) protocol will soon be able to connect directly to personal computers (PC). BT-capable hearing aids of the related art are expensive (~USD 3000-USD 5000), and, hence, are inaccessible to the majority of the global population experiencing degrees of hearing loss. People with hearing impairment experience disadvantages when participating in online communication and other audio-based computing tasks. These communication barriers have been recently amplified due to remote school and work model adopted in response to Covid-19.

In BT-enabled hearing aids of the related art, all audio processing and adaptation to personal audibility curves are carried out in the hearing aids. Further related art uses artificial intelligence (AI) mechanism to improve speech recognition. In further related art, a personal computer (PC) transmits raw audio streams to headphones.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

The following detailed description refers to the accompanying drawings that show, by way of illustration, specific details and examples in which the disclosure may be practiced. One or more examples are described in sufficient detail to enable those skilled in the art to practice the disclosure. Other examples may be utilized and structural, logical, and electrical changes may be made without departing from the scope of the disclosure. The various examples described herein are not necessarily mutually exclusive, as some examples can be combined with one or more other examples to form new examples. Various examples are described in connection with methods and various examples are described in connection with devices. However, it may be understood that examples described in connection with methods may similarly apply to the devices, and vice versa. Throughout the drawings, it should be noted that like reference numbers are used to depict the same or similar elements, features, and structures.

Figure 1:
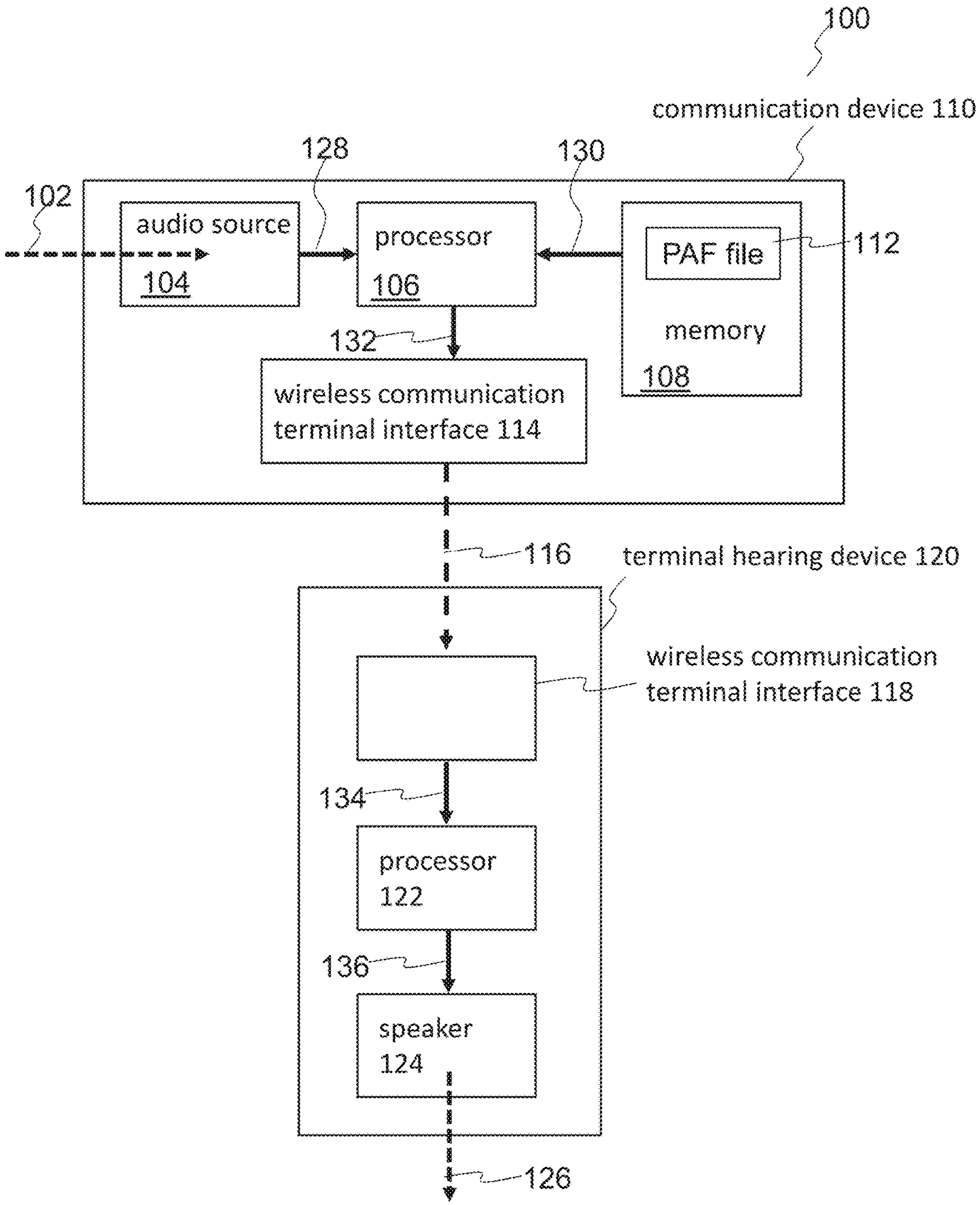
FIG. 1 illustrates exemplary schematic diagrams of a hearing aid system.

FIG. 1 illustrates a hearing aid system 100 that includes at least one communication device 110 and a terminal hearing device 120. Illustratively, the hearing aid system 100 enables the use of lower cost ear buds (<USD 200) as terminal hearing device 120 as an alternative to hearing aids of the related art, when connected to the communication device 110. The communication device 110 may be a personal computer (PC) but is not limited to a PC. This way, a larger portion of the population with hearing loss gains access to improved hearing when using the communication device 110. The communication device 110 may be any kind of computing device having a communication interface providing a communication capability with the terminal hearing device 120. By way of example, the communication device 110 may include or be a terminal communication device such as a smartphone, a tablet computer, a wearable device (e.g. a smart watch), an ornament with an integrated processor and communication interface, a laptop, a notebook, a personal digital assistant (PDA), and the like.

Illustratively, the hearing aid system 100 shifts a remarkable portion of the computational effort and audio adaptation derived from a personal audibility curve to the communication device 110 and utilizes computing resources of the communication device 110. This enables higher quality enhanced audio and speech recognition for people with hearing impairment at an affordable cost, e.g. by using ear buds as terminal hearing devices 120. Moving the audibility curve, e.g. stored in a personal audibility feature (PAF) file 112, to the communication device 110 allows users to keep a personal setting which can be deployed across various communication devices, e.g. audio peripherals, while keeping a record within the ecosystem of the user's devices. The PAF file further contains audio reproduction feature of the terminal hearing device 120 allowing an improved user-terminal hearing device-pair specific audio amplification. Further, an identification of the terminal hearing device 120 is stored in the PAF file, and thus allows fast and reliable connection of the terminal hearing device to one or more communication device. As an example, in case the terminal hearing device is to be coupled to a new communication device, the pairing process between the communication device and the terminal hearing device may be improved when the communication device already knows the terminal hearing device from the PAF file. Here, the communication device 110 loads the PAF file, e.g. from a cloud server, when starting a respective hearing aid application on the communication device for the first time.

In other words, the hearing aid system 100 employs as such conventional terminal hearing devices, e.g. ear buds, headphones, etc., but the audio processing, the artificial intelligence (AI), the personal audibility curve and the acoustic setup of the terminal hearing device are outsourced to the communication device 110 that is external to the terminal hearing device 120. This way, a low cost hearing aid system 100 can be provided. Further, an adaptation and improved tailored audio quality is provided for a general population, e.g. improved tuning, improved AI feature set for speech recognition and clarity, improved noise cancelling, improved feedback suppression, and/or improved binaural link.

Further, the communication device 110 may personalize the hearing thresholds per user and terminal hearing device 120, e.g. generate an audibility preference profile stored in the PAF file. The computing device 110 may define the Personal Auditability Feature (PAF) file 112 specific to the hearing impairment of the user of the hearing aid system 100, an audio reproduction preference of the user, and the audio reproduction feature(s) of the terminal hearing device 120. As an illustrative example, the PAF file 112 can include audiograms, but also other features, e.g. phonetic recognition WIN/HINT tests of a user. The PAF file 112 may be shared between a plurality of communication devices 110, e.g. via a server, e.g. a cloud server. This way, different communication devices 110 supporting a hearing aid application (in the following also denoted as App) using the PAF file 112 can be used. The calibration of the PAF file 112 can be done by an audiologist connecting to the application program running on the communication device 110 to guide the test procedure. Alternatively, or in addition, an AI-based calibration mechanism on the communication device 110 defining the test procedure can be used.

As an example, the PAF file 112 may have the following content: terminal hearing device identification, user audiogram(s), user WIN/HINT test results. These test results can be used automatically to trim the various audio algorithms, e.g., equalizer, frequency compression, AI-based speech enhancement, as an example. The PAF file 112 may also include target audio correction algorithm coefficients (for known algorithms). The target audio correction algorithm coefficients may be trimmed manually by an audiologist or the user of the hearing aid system. The communication device 110 may support using new algorithms for the hearing aid system. The new algorithms may use raw test data stored in the PAF file 112, and may store target audio correction algorithm coefficients in follow up revisions in the PAF file 112.

The communication device 110 may include at least one processor 106 coupled between a wireless communication terminal interface 114 and an audio source 104; and a memory 108 having the PAF file 112 stored therein and coupled to the processor 106. The memory provides 130 the PAF file 112 to the processor 106 to provide the adapted audio stream to the terminal hearing device 120.

The audio source 104 may be a microphone as an example. However, the audio source 104 may be any kind of sound source, e.g. an audio streaming server.

The processor 106 may be configured to provide an audio stream 132 to the wireless communication terminal interface 114 based on a received audio signal 102 using the audio source 104. As an example, the audio source 104 may provide a digital audio signal 128 associated with the received audio signal 102 from the scene (also denoted as environment) of the hearing aid system 100. As an example, the scene may provide a conversation between people, a public announcement, a telephone call, a television stream. The processor 106 of the communication device 110 may provide personalized audio processing, e.g. amplifying and/or equalizing, of the audio signal 128 based on the PAF file 112 and a machine learning algorithm. Illustratively, the personalized audio processing of the audio signal corresponds to information stored in the PAF file 112. The personalized audio processing may include a linear processing, e.g. a linear equalizing, or non-linear, e.g. frequency compression.

The communication device 110 may be a mobile communication device 110. As an example, the communication device 110 may be a Cloud terminal.

The terminal hearing device 120 may include a wireless communication terminal interface 118 configured to be communicatively coupled to the wireless communication terminal interface 114 of the communication device 110; a speaker 124 and at least one processor 122 coupled between the wireless communication terminal interface 118 and the speaker 124. The processor 122 may be configured to provide a signal 136 to the speaker from the audio packets 134 provided by the wireless communication terminal interface 114. The speaker 124 provides a PAF-modified audio signal 126 to the predetermined user of the hearing aid system 100. In other words, the PAF-modified audio signal 126 may be a processed version of the audio signal 102, wherein the processing is based on the information stored in the PAF file 112 correlating to features of a hearing impairment of the user of the hearing aid system 100 and audio reproduction features of the terminal hearing device 120.

The terminal hearing device 120 may include at least one earphone. The terminal hearing device 120 may be an in-the-ear phone (also referred to as earbuds), as an example. As an example, the terminal hearing device 120 may include a first terminal hearing unit and a second terminal hearing unit. As an example, the first terminal hearing unit may be configured for the left ear of the user, and the second terminal hearing unit may be configured for the right ear of the user, or vice versa. However, the user may also have only one ear, or may have only one ear having a hearing impairment. The terminal hearing device 120 may include a first terminal hearing unit that may include a first communication terminal interface 118 for a wireless communication link with the communication device 110. Further, the first and second terminal hearing units may include second communication terminals respectively for a wireless communication link between the first and second terminal hearing units. The terminal hearing device 120 may include or be any kind of headset that includes a communication terminal interface 118 for a wireless communication link with the communication device 110.

The wireless communication terminal interfaces 114, 118 of the communication device 110 and the terminal hearing device 120 may be configured as a short range mobile radio communication interface such as e.g. a Bluetooth interface, e.g. a Bluetooth Low Energy (LE) interface, Zigbee, Z-Wave, WiFi HaLow/IEEE 802.11ah, and the like. By way of example, one or more of the following Bluetooth interfaces may be provided: Bluetooth V 1.0A/1.0B interface, Bluetooth V 1.1 interface, Bluetooth V 1.2 interface, Bluetooth V 2.0 interface (optionally plus EDR (Enhanced Data Rate), Bluetooth V 2.1 interface (optionally plus EDR (Enhanced Data Rate), Bluetooth V 3.0 interface, Bluetooth V 4.0 interface, Bluetooth V 4.1 interface, Bluetooth V 4.2 interface, Bluetooth V 5.0 interface, Bluetooth V 5.1 interface, Bluetooth V 5.2 interface, and the like. Thus, illustratively, the hearing aid system 100 applies PAF on audio samples that go from or to Bluetooth Low Energy (BLE) audio (e.g. compressed) streams or any other as short range mobile radio communication audio stream as a transport protocol.

Wireless technologies allow wireless communications between the terminal hearing device 120 and the communication device 110. The communication device 110 is a terminal hearing device-external device, e.g. a mobile phone, tablet, iPod, etc.) that transmits adapted audio packets to the terminal hearing device 120. The terminal hearing device 120 streams audio from the communication device 110, e.g. using an Advanced Audio Distribution Profile (A2DP). For example, a terminal hearing device 120 can use Bluetooth Basic Rate/Enhanced Data Rate™ (Bluetooth BR/EDR™) to stream audio streams from a smartphone (as communication device) configured to transmit audio using A2DP. When transporting audio data, Bluetooth Classic profiles, such as the A2DP or the Hands Free Profile (HFP), offer a point-to-point link from the communication device 110 to the terminal hearing device 120.

The PAF file 112 may include personal auditability feature of the predetermined user and audio reproduction feature of the terminal hearing device 120. The PAF file 112 may be a single sharable file that may include the personal auditability feature of the user and the audio reproduction feature of the terminal hearing device 120. As an example, the personal auditability feature may include a personal audibility curve. Further, the personal auditability feature may include at least one personal audibility preference profile. The personal audibility preference profile may include a hearing preference of the predetermined user. As an example, a personal audibility preference profile may include information correlated to a processing based on the scene of the hearing aid system, e.g. audio filter and amplification settings for different surroundings (e.g. a different audio setting in public transportation and for conversations), and/or an individual tuning setting, e.g. a preference to amplify hearing frequency stronger than required from the personal audibility curve, as an example.

The audio reproduction feature may include information of a unique ID, a name, a network address and/or a classification of the terminal hearing device 120. The audio reproduction feature may also include an audio mapping curve of the speaker 124 of the terminal hearing device 120. Here, an audio mapping curve may be understood as an acoustic reproduction accuracy of a predetermined audio spectrum by the speakers of the terminal hearing device 120.

The communication device 110 may be configured to determine the personal auditability feature by the user using the terminal hearing device, e.g. in a software program product or module of the hearing aid application. As an example, the communication device 110 may provide a hearing in noise test (HINT) and/or a words in noise (WIN) test, e.g. using a chat robot guiding through the procedure, to determine a personal audibility curve, e.g. a personal equal loudness contour according to ISO 226:2003, that is stored in PAF file.

The communication device 110 may be a first communication device 110 and may be further configured for a communication connection to at least a second communication device, e.g. of a plurality of potential communication devices. The first communication device 110 may transmit the PAF file 112 to the second communication device when the terminal hearing device 120 forms a wireless communication link with the second communication device 110. Alternatively, or in addition, the first communication device 110 may transmit the PAF file 112 to the second communication device when the terminal hearing device 120 forms a wireless communication link with the first communication device 110.

Figure 2A:
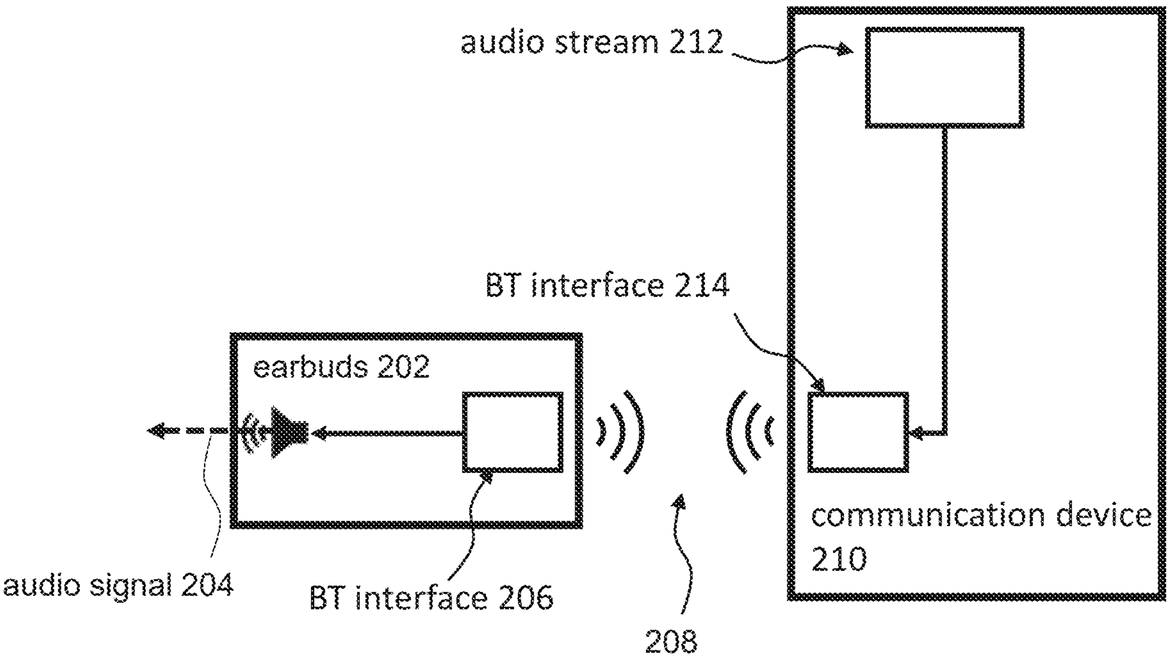
FIG. 2A and FIG. 2B illustrate conventional examples.

FIG. 2A illustrates an audio system of a comparative conventional example. Here, a communication device 210, e.g. a PC, provides an audio stream 212 to a BT interface 214. The communication device 210 transmits the audio stream via a BT link 208 to earbuds 202 (as one example of a terminal hearing device) through a BT interface 206 to emit the audio signal 204 via a speaker of the earbuds.

Figure 2B:
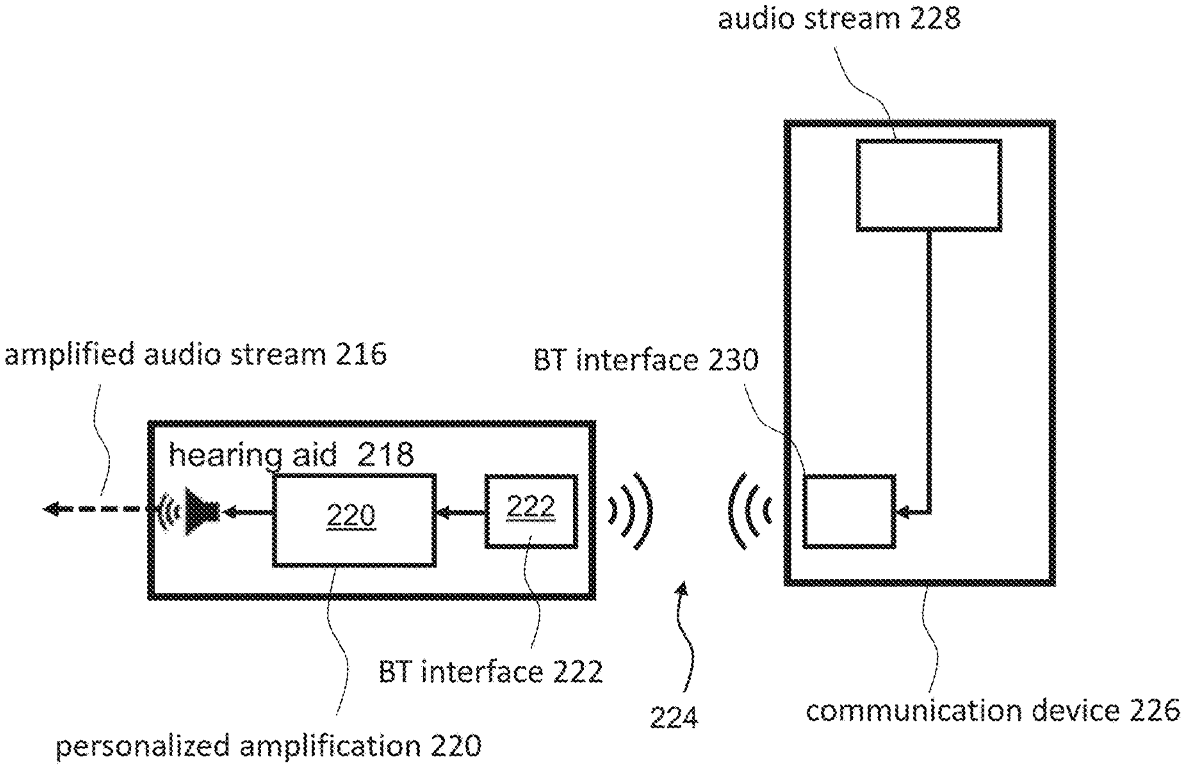

FIG. 2B illustrates a hearing aid system of a comparative conventional example. Here, a communication device 226, e.g. a PC, provides an audio stream 228 to a BT interface 230. The communication device 226 transmits the audio stream via a BT link 224 to a hearing aid 218 through a BT interface 222. The hearing aid 218 provides some personalized amplification 220 and emits the amplified audio stream 216 via a speaker of the hearing aid 218.

Figure 2C:
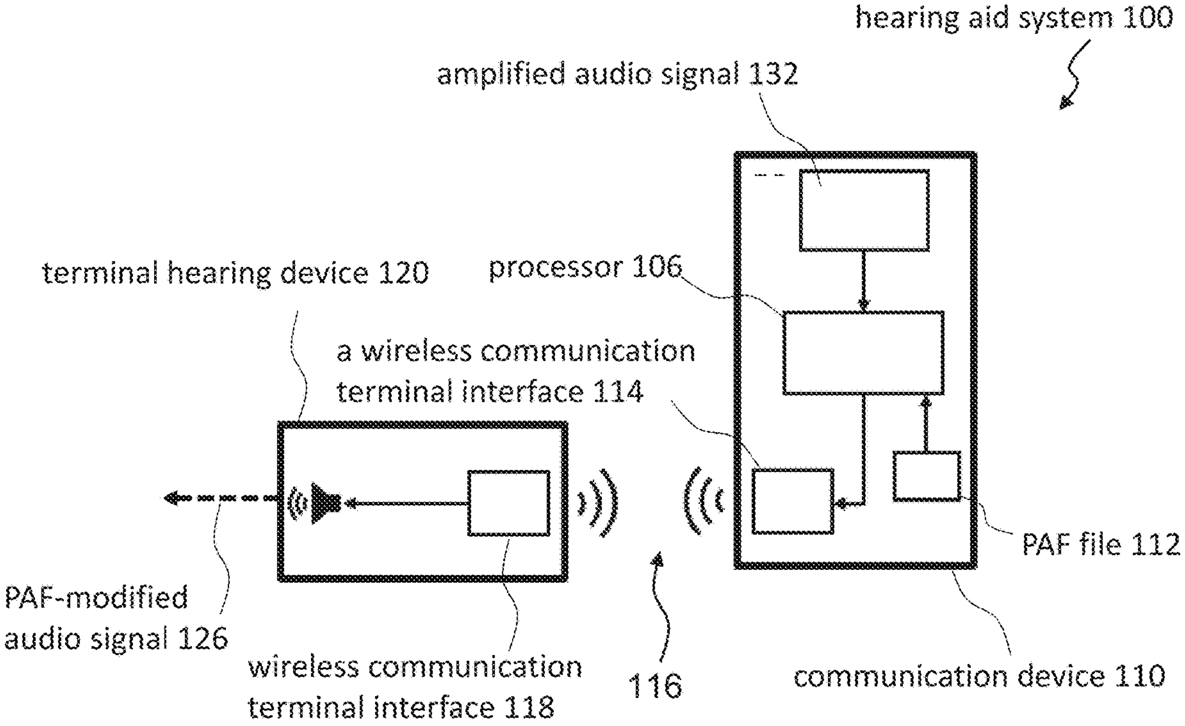
FIG. 2C illustrates an exemplary schematic diagram of a hearing aid system.

Thus, in comparison, in the hearing aid system 100 illustrated in FIG. 1 and FIG. 2C, the user-personalized audio processing of the hearing aid of FIG. 2B is outsourced in the communication device 110. In addition, the PAF file 112 further considers features of the terminal hearing device 120 in the emitted amplified audio signal 126.

As illustrated in FIG. 1 and FIG. 2C, the communication device 110 receives audio signals 102, e.g. a sound, in an audio source 104 and processes them in the processor 106 connected between the audio source 104 and the wireless communication terminal 114.

The processor 106 may include a controller, computer, software, etc. The processor 106 processes the audio signal 102 in a user-terminal hearing device specific-manner. The processing can vary with frequency, e.g. according to the PAF file 112. This way, the communication device 110 provides a personalized audible signal to the user of the terminal hearing device 120.

As an example, the processor 106 amplifies the audio signal 102 in the frequency band associated with human speech more than the audio signal 102 associated with environmental noise. This way, the user of the hearing aid system can hear and participate in conversations.

The processor 106 may be a single digital processor 106 or may be made up of different, potentially distributed processor units. The processor 106 may be at least one digital processor 106 unit. The processor 106 can include one or more of a microprocessor, a microcontroller, a digital processor 106 (DSP), an application specific integrated circuit (ASIC), a field-programmable gate array (FPGA), discrete logic circuitry, or the like, appropriately programmed with software and/or computer code, or a combination of special purpose hardware and programmable circuitry. The processor 106 may be further configured to differentiate sounds, such as speech and background noise, and process the sounds differently for a seamless hearing experience. The processor 106 can further be configured to support cancellation of feedback or noise from wind, ambient disturbances, etc. The processor 106 can be configured to access programs, software, etc., which can be stored in a memory 108 in the communication device 110 or in an external memory, e.g. in a computer network, such as a cloud.

A program of the communication device 110 may determine the user's hearing loss and/or the user's hearing preference, and may adjust the PAF file 112 accordingly. The processor 106 can further include one or more analog-to-digital (A/D) and digital-to-analog (D/A) converters for converting various analog inputs to the processor 106, such as analog input from the audio source 104, for example, in digital signals and for converting various digital outputs from the processor 106 to analog signals representing audible sound data which can be applied to the speaker, for example. The analog audio signal 102 generated by the audio source 104 may be converted to a digital audio signal 128 by an analog-to-digital (ND) converter of the processor 106. The processor 106 may process the digital audio signal 128 to shape the frequency envelope of the digital audio signal 128 to enhance signals based on the PAF filed 112 to improve their audibility for a user of the hearing aid system 100.

As an example, the processor 106 may include an algorithm that sets a frequency-dependent gain and/or attenuation for the audio signal 102 received via the one or more audio source 104, e.g. microphone, of the communication device 110 based on the PAF file 112.

The processor 106 may also include a classifier, and a sound analyzer. The classifier analyzes the sound received by one or more audio source 104 of the communication device 110. The classifier classifies the hearing condition based on the analysis of the characteristics of the received sound. For example, the analysis of the picked-up sound can identify a quiet conversation, talking with several people in a noisy location; watching TV; etc. After the hearing conditions have been classified, the processor 106 can select and use a program to process the received audio signal 102 according to the classified hearing conditions. For example, if the hearing condition is classified as a conversation in a noisy location, the processor 106 can amplify the frequency of the received audio signal 102 based on information stored in the PAF file 112 associated with the conversation and attenuate ambient noise frequencies.

The memory 108 storing the PAF file 112 may include one or more volatile, non-volatile, magnetic, optical, or electrical media, such as read-only memory (ROM), random access memory (RAM), electrically-erasable programmable ROM (EEPROM), flash memory, or the like.

Each user of the hearing aid system has a specific hearing profile saved in a PAF file 112 that is specific for each combination (user and terminal hearing device). The personal audibility feature profiles may be frequency dependent. Each PAF file 112 may address a user specific expected communication device 110 response with respect to the respective terminal hearing device. The PAF file 112 stored in the memory may store tables with pre-determined values, ranges, and thresholds, as well as program instructions that may cause the processor 106 to access the memory, execute the program instructions, and provide the functionality ascribed to it herein. The user of the hearing aid system 100 can also perform manual settings in the program. The parameters can be adjusted based on empirical values determined from the response of the user. The parameters may be stored as personal audibility preference profile in the PAF file 112.

As an example of a processor 106, the processor 106 is a device that provides amplification, attenuation, or frequency modification of audio signals 102, provided from the audio source 104 of the device of the communication device 110, transmitted to the terminal hearing device 120 to compensate for hearing loss or difficulty (also denoted as hearing impairment).

The processor 106 in combination with the PAF file 112 may be adapted for adjusting a sound level pressure and/or frequency-dependent gain of the audio signal. In other words, the processor 106 processes the audio signal based on the information stored in PAF file 112 specific to the user using the hearing aid system 100 and the used terminal hearing device 120.

The processor 106 provides the amplified audio signal 132 to the wireless communication terminal interface 114. The wireless communication terminal interface 114 provides the amplified audio signal 132 in audio packets to the wireless communication terminal interface 118 of the terminal hearing device 120.

The terminal hearing device 120 includes a sound output device (also denoted as sound generation device), e.g. an audio speaker or other type of transducer that generates sound waves or mechanical vibrations that the user perceives as sound.

In operation, the communication device 110 can wirelessly transmit audio packets via a wireless communication link 116, which can be received by the terminal hearing device 120. The audio packets can be transmitted and received through wireless links using wireless communication protocols, such as Bluetooth or Wi-Fi® (based on the IEEE 802.11 family of standards of the Institute of Electrical and Electronics Engineers), or any other suitable radio frequency (RF) communication protocol. The Bluetooth Core Specification specifies the Bluetooth Classic variant of Bluetooth, also known as Bluetooth Basic Rate/Enhanced Data Rate™ (Bluetooth BR/EDR™). The Bluetooth Core Specification further specifies the Bluetooth Low Energy variant of Bluetooth, also known as Bluetooth LE, or BLE. The communication device 110 and the terminal hearing device 120 may be configured to support the A2DP which is suitable for audio streaming from the communication device to the terminal hearing device, e.g. streaming of a mono or stereo audio stream, and the "hands-free profile" (HFP). Both profiles offer a point-to-point link from the communication device 110 as an audio source to the terminal hearing device 120 as an audio destination.

The communication device 110 may be a mobile phone, e.g., a smartphone, such as an iPhone, Android, Blackberry, etc., a Digital Enhanced Cordless Telecommunications ("DECT") phone, a landline phones, tablets, a media players, e.g., iPod, MP3 player, etc.), a computer, e.g., desktop or laptop, PC, Apple computer, etc.; an audio/video (AN) wireless communication terminal that can be part of a home entertainment or home theater system, for example, a car audio system or circuitry within the car, remote control, an accessory electronic device, a wireless speaker, or a smart watch, or a Cloud computing device, or a specifically designed universal serial bus (USB) drive.

A terminal hearing device 120 can be a prescription device or a non-prescription device configured to be worn on or near a human head. A prescription device may include an ear-piece, e.g. earphones, specifically adapted to the ear canal of the user. A non-prescription may be a conventional headphone, a headset, an ear bud-set, as example. Different styles of terminal hearing devices 120 exist in the form of behind-the-ear (BTE), in-the-ear (ITE), completely-in-canal (CIC) types, as well as hybrid designs consisting of an outside-the-ear part and an in-the-ear part. A terminal hearing device 120 may be a hearing prosthesis, cochlear implants, earphones, headphones, ear buds, a headset or any other kind of a personal terminal hearing device 120.

The processing in the processor 106 may include, in addition to the audio signal and the information stored in the PAF file 112, inputting context data into a machine learning algorithm. The context data may be derived from the audio signal 102, e.g. based on a noise level or audio spectrum.

The machine learning algorithm may be trained with historical context data to classify the terminal hearing device 120, e.g. as one of a plurality of potential predetermined terminal hearing devices. The machine learning algorithm may include a neuronal network, a statistical signal processing and/or a support vector machine. In general, the machine learning algorithm may be based on a function, which has input data in form of context data and which outputs a classification correlated to the context data. The function may include weights, which can be adjusted during training.

During training, historical data or training data, e.g. historical context data and corresponding to historical classifications may be used for adjusting the weights. However, the training may also take place during the usage of the hearing aid system 100. As an example, the machine learning algorithm may be based on weights, which may be adjusted during learning. When a user establishes a communication connection between a communication device and the terminal hearing device, the machine learning algorithm may be trained with context data and the metadata of the terminal hearing device. An algorithm may be used to adapt the weighting while learning from user input. As an example, the user may manually choose another speaker to be listened to, e.g. active listening or conversing with a specific subset of individuals. In addition, user feedback may be reference data for the machine learning algorithm.

The metadata of the terminal hearing device 120 and the context data of the audio signal may be input into the machine learning algorithm. For example, the machine learning algorithm may include an artificial neuronal network, such as a convolutional neuronal network. Alternatively, or in addition, the machine learning algorithm may include other types of trainable algorithm, such as support vector machines, pattern recognition algorithm, statistical algorithm, etc. The metadata may be audio reproduction feature of the terminal hearing device and may contain information about unique IDs, names, network address, etc.

The terminal hearing device 120 may include a speaker 124, e.g. an electro-acoustic transducer configured to convert audio information into sound.

The terminal hearing device 120 may include one or more terminal hearing unit(s), e.g. one intended to be worn for the left ear and another for the right ear of the user. Terminal hearing units may be linked to one another, e.g. in case of a binaural hearing system. For example, the terminal hearing units may be linked together to allow communication between the two terminal hearing units. The terminal hearing device 120 is preferably powered by a replaceable or rechargeable battery.

In an alternative example, the hearing aid system 100 may be used to augment the hearing of normal hearing persons, for instance by means of noise suppression, to the provision of audio signal 102 originating from remote sources, e.g., within the context of audio communication, and for hearing protection.

Figure 3:
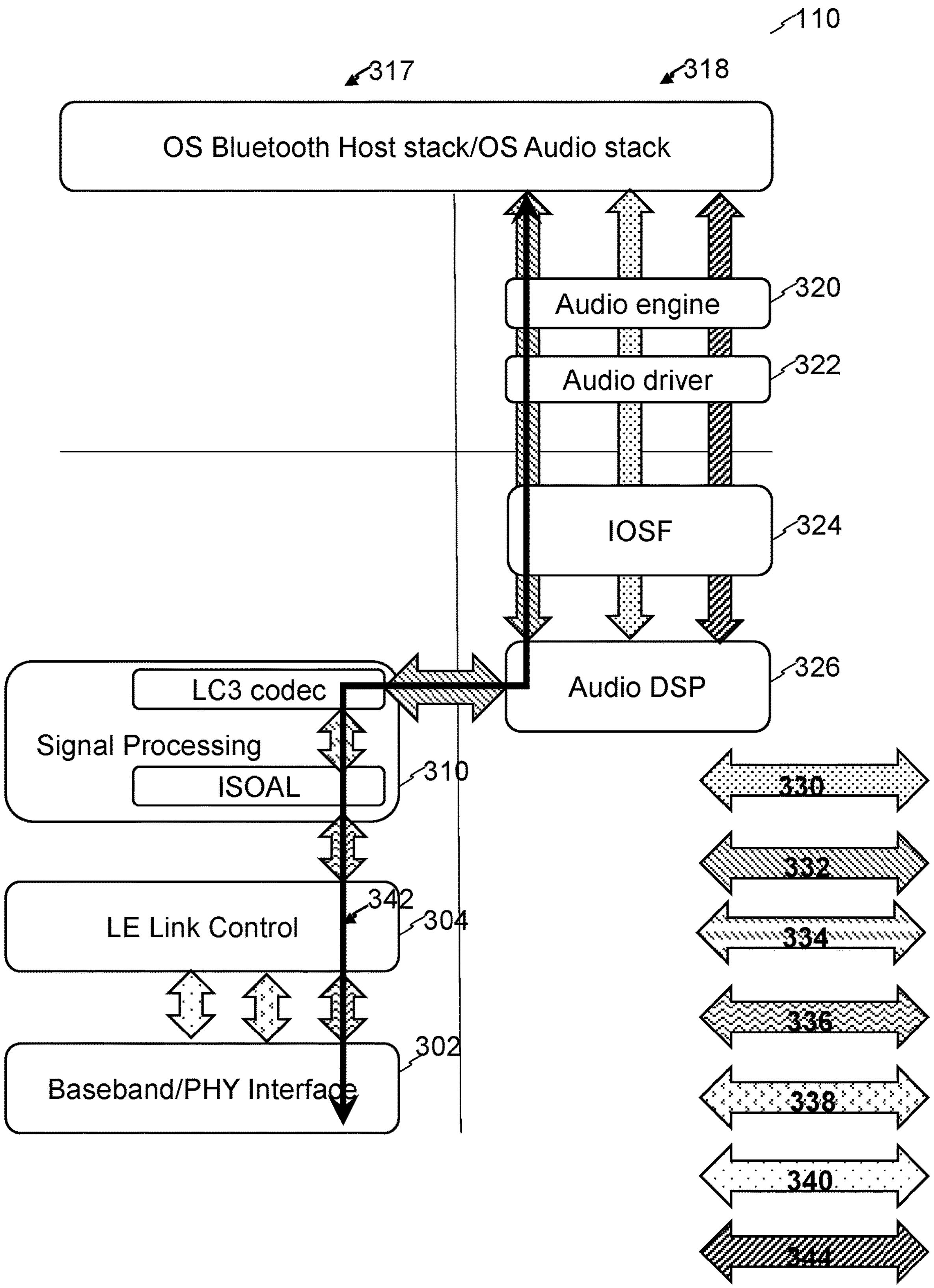
FIG. 3 illustrates an exemplary flow chart for a hearing aid system.

FIG. 3 illustrated a flow chart for audio and BT-LE stack signaling in a communication device 110 having an embedded two processor configuration in an A2DP profile, as an example. The abbreviations illustrated in FIG. 3 may correspond to the notation used in the Bluetooth Core Specification Version 5.3 (2021 Jul. 13) and the Low Complexity Communication Codec (LC3) Version 1.0 (2020 Sep. 15). The flow chart may describe only the coding of a single audio channel. A stereo or multi-channel coding may be supported by coding of multiple mono streams.

The left side of FIG. 3 illustrates a BT host stack 317 of a Low Energy (LE) Controller including the physical layer (PHY) including the baseband/PHY interface 302, and the Link Layer including the LE Link Control 304 and a signal processing 310 in the audio profile including the LC3 codec. Further illustrated are ISO schedule 338 and ISO control 340 between the baseband 302 and the LE Link Control 304, and ISO LC3 Data 336 from the signal processing 310 through the LE Link Control 304 to the Baseband 302.

The right side of FIG. 3 illustrates the audio stack 318 utilizing an audio source, e.g. a microphone, used to provide the audio signals from the scene of the communication device (see FIG. 1). The host 318 may be implemented in the processor of the communication device.

An audio digital signal processor (DSP) 326 may process raw audio samples 330 to the operating system (OS) of the audio stack via an audio driver 322 and an audio engine 320. The audio stack host 318 may control the LC3 of the Audio DSP 326 using LC3 control 344. Illustratively, the audio stack host 318 provides the raw audio samples 330 to the audio host, e.g. the processor of the communication device, that provides an amplified audio stream 332 corresponding to the information stored in the PAF file, and provides the PAF-amplified audio signal 332 to the baseband 302 of the Bluetooth host stack 317 using the LC3 codec via a Pulse Coded Modulation (PCM)/I2S side band (in FIG. 3 illustrated by arrow 342) through the link control 304 for transmission to the terminal hearing device (not illustrated). In the signal processing 310, LC3 converts the amplified audio stream 332 to coded LC3 334 to the Isochronous Adaptation Layer (ISOAL). ISOAL transmits the coded LC3 to the Baseband 302 as ISO LC3 data 336.

Figure 4:
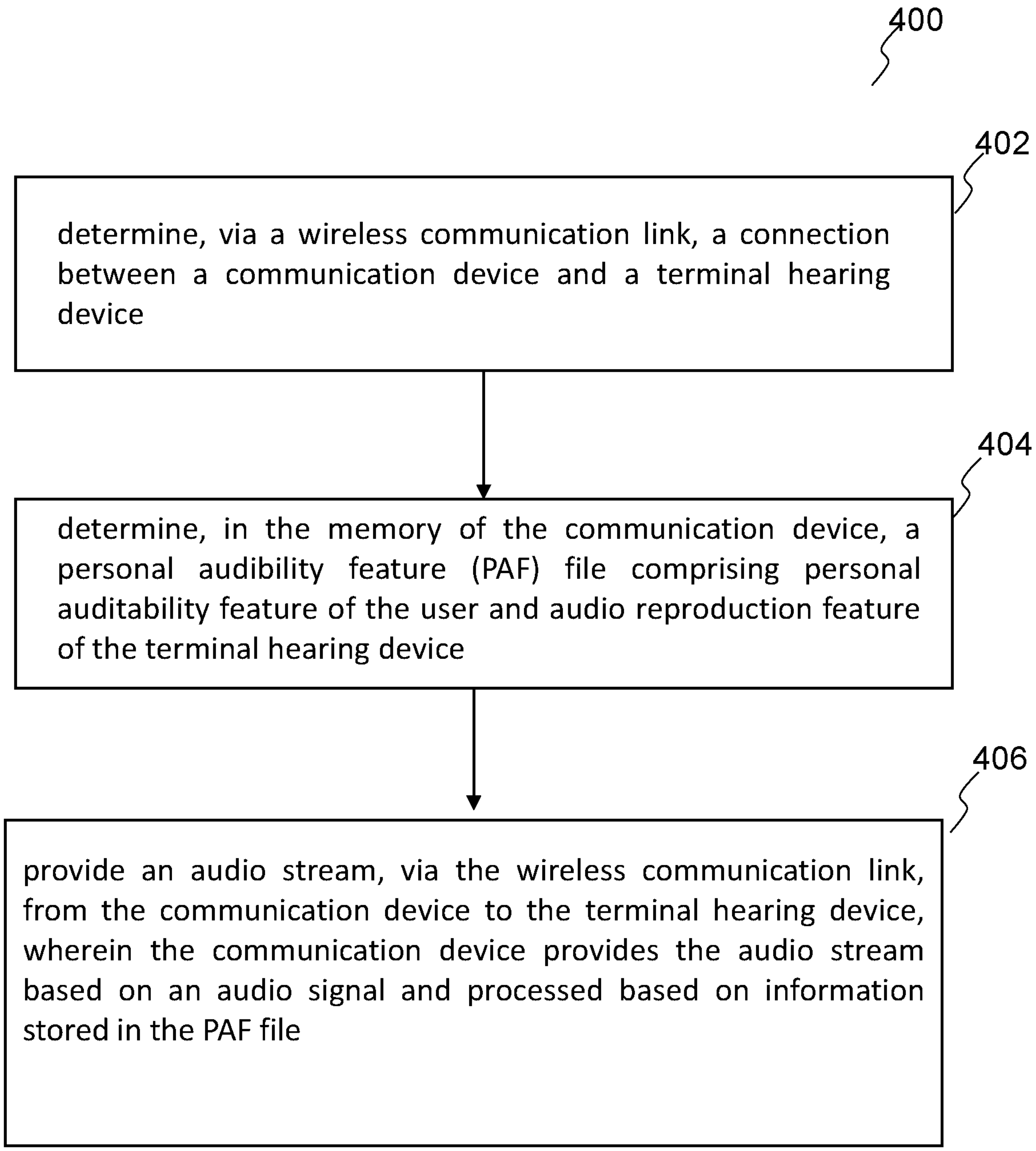
FIG. 4 illustrates an exemplary flow chart of a method for amplifying an audio stream.

FIG. 4 illustrated a flow chart of a method for amplifying an audio stream. A non-transitory computer readable medium may include instructions which, if executed by one or more processors, e.g. of the communication device, cause the one or more processors to: determine 402, via a wireless communication link, a connection between a communication device and a terminal hearing device; determine 404, in the memory of the communication device, a personal audibility feature (PAF) file including personal auditability feature of the user and audio reproduction feature of the terminal hearing device; and provide 406 an audio stream, via the wireless communication link, from the communication device to the terminal hearing device, wherein the communication device provides the audio stream based on an audio signal, provided using an audio source of the communication device, and processed based on information stored in the PAF file.

For example, the instructions may be part of a program that may be executed in the processor of the communication device of the hearing aid system. The computer-readable medium may be a memory of this communication device. The program also may be executed by the processor of the communication device and the computer-readable medium may be a memory of the communication device.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. The computer-readable medium may be a non-transitory or transitory medium.

As used herein, a program is a set of instructions that implement an processing algorithm for setting the audio frequency shaping or compensation provided in the processor. An amplification algorithm may be an example of a processing algorithm. The amplification algorithms may also be referred to as "gain-frequency response" algorithms.

The PAF file may be generated by software, e.g. an application installed on the communication device that guides the user through a do-it-yourself audiometric testing process. In yet another embodiment, audiometric testing information needed to generate the hearing loss profile may be acquired by the communication device itself. This audiometric testing information may be uploaded from the communication device via an interface to the internet, through which it is communicated to a listening device programming entity.

The PAF file may include an audiogram representing a hearing impairment of the user in graphical format or in tabular form in the PAF file. The audiogram indicates a compensation amplification (e.g. in decibels) needed as a function of frequency (e.g. in Hertz) across the audible band to reduce the hearing impairment of the user.

The processor of the communication device loads the personal audibility profile from the PAF file and based thereon determines a best-fit hearing correction algorithm for the user for the audio signal provided from the audio source of the communication device. The best-fit algorithm may define the optimum amplitude-versus-frequency compensation function to compensate for the hearing impairment of the user as indicated by the personal audibility profile. The processor of the communication device may upload the best-fit hearing correction algorithm to the PAF file.

EXAMPLES

The examples set forth herein are illustrative and not exhaustive.

Example 1 may be a communication device may including at least one processor coupled between a wireless communication terminal interface and an audio source; and a memory having a personal audibility feature (PAF) file stored therein and coupled to the processor, wherein the processor may be configured to provide an audio stream to the wireless communication terminal interface based on a processed audio signal, provided using the audio source, wherein the processing corresponds to the information stored in the PAF file, the PAF file may including personal auditability feature of a predetermined user and an audio reproduction feature of a predetermined terminal hearing device.

In Example 2, the subject matter of Example 1 can optionally include that the personal auditability feature may include a personal audibility curve.

In Example 3, the subject matter of Example 1 or 2 can optionally include that the personal auditability feature may include at least one personal audibility preference profile.

In Example 4, the subject matter of any one of Examples 1 to 3 can optionally include that the audio reproduction feature may include information of a unique ID, a name, a network address and/or a classification of the predetermined terminal hearing device.

In Example 5, the subject matter of any one of Examples 1 to 4 can optionally include that the processor may be configured to process the audio signal based on the PAF file and a machine learning algorithm.

In Example 6, the subject matter of any one of Examples 1 to 5 can optionally be configured to determine the personal auditability feature by the user using the terminal hearing device or a remote connection to another remote communication device. The PAF file may be generated using the remote connection by an audiologist or using an artificial intelligence application running on the communication device.

In Example 7, the subject matter of any one of Examples 1 to 6 can optionally include a second communication terminal interface, wherein the communication device may be configured to transmit the PAF file, using the second communication terminal interface, to a second communication device when the second communication device reports a wireless communication link with the terminal hearing device to the communication device via the second communication terminal interface.

In Example 8, the subject matter of any one of Examples 1 to 7 can optionally include that the communication device may be configured to transmit the PAF file stored in the memory to at least a third communication device when the communication device formed a communication link with the terminal hearing device.

Example 9 is a hearing aid system that may include at least one communication device and a terminal hearing device. The communication device may including at least one processor coupled between a wireless communication terminal interface and an audio source; and a memory having a personal audibility feature (PAF) file stored therein and coupled to the processor, wherein the processor may be configured to provide an audio stream to the wireless communication terminal interface based on a processed audio signal, provided using the audio source, wherein the processing corresponds to the information stored in the PAF file, the PAF file may including personal auditability feature of a predetermined user and an audio reproduction feature of the terminal hearing device. The terminal hearing device may include a wireless communication terminal interface configured to be communicatively coupled to the wireless communication terminal interface of the communication device; a speaker and at least one processor coupled between the wireless communication terminal interface and the speaker.

In Example 10, the subject matter of Example 9 can optionally include that the communication device may be a mobile communication device.

In Example 11, the subject matter of any one of Examples 9 to 10 can optionally include that the communication device may be a Cloud terminal.

In Example 12, the subject matter of any one of Examples 9 to 11 can optionally include that the PAF file may be a single file may including the personal auditability feature of the user and the audio reproduction feature of the terminal hearing device.

In Example 13, the subject matter of any one of Examples 9 to 12 can optionally include that the personal auditability feature may include a personal audibility curve.

In Example 14, the subject matter of any one of Examples 9 to 13 can optionally include that the personal auditability feature may include at least one personal audibility preference profile.

In Example 15, the subject matter of any one of Examples 9 to 14 can optionally include that the audio reproduction feature may include information of a unique ID, a name, a network address and/or a classification of the terminal hearing device.

In Example 16, the subject matter of any one of Examples 9 to 15 can optionally include that the processor of the communication device processes the audio signal based on the PAF file and a machine learning algorithm.

In Example 17, the subject matter of any one of Examples 9 to 16 can optionally include that the wireless communication terminal interfaces of the communication device and the terminal hearing device may be configured as Bluetooth interface, in particular a Bluetooth Low Energy interfaces.

In Example 18, the subject matter of any one of Examples 9 to 17 can optionally include that the terminal hearing device includes at least one earphone.

In Example 19, the subject matter of any one of Examples 9 to 18 can optionally include that the terminal hearing device is an in-the-ear phone.

In Example 20, the subject matter of any one of Examples 9 to 19 can optionally include that the terminal hearing device may include a first terminal hearing unit and a second terminal hearing unit.

In Example 21, the subject matter of any one of Examples 9 to 20 can optionally include that the terminal hearing device may be an in-the-ear phone.

In Example 21, the subject matter of any one of Examples 9 to 20 can optionally include that the terminal hearing device may include a first terminal hearing unit may including a first communication terminal interface for a wireless communication link with the communication device, and wherein the first and second terminal hearing units may include second communication terminals respectively for a wireless communication link between the first and second terminal hearing units.

In Example 22, the subject matter of any one of Examples 9 to 21 can optionally include that the communication device may be configured to determine the personal auditability feature by the user using the terminal hearing device.

In Example 23, the subject matter of any one of Examples 9 to 23 can optionally include that the communication device may be a first communication device and may be further configured for a communication connection to at least a second communication device, wherein the first communication device transmits the PAF file to the second communication device when the terminal hearing device forms a wireless communication link with the second communication device, or wherein the first communication device transmits the PAF file to the second communication device when the terminal hearing device forms a wireless communication link with the first communication device.

Example 24 is a non-transitory computer readable medium may including instructions which, if executed by one or more processors, cause the one or more processors to: determine, via a wireless communication link, a connection between a communication device and a terminal hearing device; determine, in the memory of the communication device, a personal audibility feature (PAF) file may including personal auditability feature of the user and audio reproduction feature of the terminal hearing device; provide an audio stream, via the wireless communication link, from the communication device to the terminal hearing device, wherein the communication device provides the audio stream based on an audio signal, provided using an audio source of the communication device, and processed based on information stored in the PAF file.

In Example 25, the subject matter of Example 24 can optionally include that the personal auditability feature may include a personal audibility curve, and the audio reproduction feature may include information of a unique ID, a name, a network address and/or a classification of the predetermined terminal hearing device.

Example 26 is a communication means, including a processing means for providing an audio stream to a wireless communication means based on a processed audio signal, determined by a means for determining an audio signal from an environment, wherein the processing corresponds to an information stored in a personal audibility feature (PAF) file, the PAF file including personal auditability feature of a predetermined user and an audio reproduction feature of a predetermined terminal hearing device.

In Example 27, the subject matter of Example 26 can optionally include that the personal auditability feature may include a personal audibility curve.

In Example 28, the subject matter of Example 26 or 27 can optionally include that the personal auditability feature may include at least one personal audibility preference profile.

In Example 29, the subject matter of any one of Examples 26 to 28 can optionally include that the audio reproduction feature may include information of a unique ID, a name, a network address and/or a classification of the predetermined terminal hearing device.

In Example 30, the subject matter of any one of Examples 26 to 29 can optionally include that the processor may be configured to process the audio signal based on the PAF file and a machine learning algorithm.

In Example 31, the subject matter of any one of Examples 26 to 30 can optionally be configured to determine the personal auditability feature by the user using the terminal hearing device.

In Example 32, the subject matter of any one of Examples 26 to 31 can optionally include a second communication terminal interface, wherein the communication device may be configured to transmit the PAF file, using the second communication terminal interface, to a second communication device when the second communication device reports a wireless communication link with the terminal hearing device to the communication device via the second communication terminal interface.

In Example 33, the subject matter of any one of Examples 26 to 32 can optionally include that the communication device may be configured to transmit the PAF file stored in the memory to at least a third communication device when the communication device formed a communication link with the terminal hearing device.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The terms "processor" or "controller" as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "connected" can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more components from a single component, mounting two or more components onto a common chassis to form an integrated component, executing discrete software components on a common processor core, etc. Conversely, skilled persons will recognize the possibility to separate a single element into two or more discrete elements, such as splitting a single component into two or more separate component, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A communication device, comprising:

at least one processor coupled to a wireless communication terminal interface and an audio source, wherein the audio source provides a digital audio signal associated with a received audio signal from a scene; and a memory having a personal audibility feature (PAF) file stored therein and coupled to the processor, wherein the processor is configured to provide an audio stream to the wireless communication terminal interface based on a processed audio signal, determined using the audio source, wherein the processing corresponds to the information stored in the PAF file, the PAF file comprising personal auditability feature of a predetermined user and an audio reproduction feature of a predetermined terminal hearing device.

2. The communication device of claim 1, wherein the personal auditability feature comprises a personal audibility curve.

3. The communication device of claim 1, wherein the personal auditability feature comprises at least one personal audibility preference profile.

4. The communication device of claim 1, wherein the audio reproduction feature comprises information of a unique ID, a name, a network address and/or a classification of the predetermined terminal hearing device.

5. The communication device of claim 1, wherein the processor is configured to process the audio signal based on the PAF file and a machine learning algorithm.

6. The communication device of claim 1, further configured to determine the personal auditability feature by the user using the terminal hearing device or a remote connection to another remote communication device.

7. The communication device of claim 6, wherein the PAF file is generated using the remote connection by an audiologist or using an artificial intelligence application running on the communication device.

8. The communication device of claim 1, further comprising a second communication terminal interface, wherein the communication device is configured to transmit the PAF file, using the second communication terminal interface, to a second communication device when the second communication device reports a wireless communication link with the terminal hearing device to the communication device via the second communication terminal interface.

9. The communication device of claim 8, wherein the communication device is configured to transmit the PAF file stored in the memory to at least a third communication device when the communication device formed a communication link with the terminal hearing device.

10. A hearing aid system, comprising at least one communication device and a terminal hearing device:

the communication device comprising at least one processor coupled to a wireless communication terminal interface and an audio source, wherein the audio source provides a digital audio signal associated with a received audio signal from a scene; and a memory having a personal audibility feature (PAF) file stored therein and coupled to the processor, wherein the processor is configured to provide an audio stream to the wireless communication terminal interface based on a processed audio signal, provided using the audio source, wherein the processing corresponds to the information stored in the PAF file, the PAF file comprising personal auditability feature of a predetermined user and an audio reproduction feature of the terminal hearing device; and the terminal hearing device comprising a wireless communication terminal interface configured to be communicatively coupled to the wireless communication terminal interface of the communication device;

a speaker and at least one processor coupled between the wireless communication terminal interface and the speaker.

11. The hearing aid system of claim 10, wherein the communication device is a mobile communication device.

12. The hearing aid system of claim 10, wherein the communication device is a Cloud terminal.

13. The hearing aid system of claim 10,
wherein the PAF file is a single file comprising the personal auditability feature of the user and the audio reproduction feature of the terminal hearing device.

14. The hearing aid system of claim 10,
wherein the personal auditability feature comprises a personal audibility curve.

15. The hearing aid system of claim 10,
wherein the personal auditability feature comprises at least one personal audibility preference profile.

16. The hearing aid system of claim 10,
wherein the audio reproduction feature comprises information of a unique ID, a name, a network address and/or a classification of the terminal hearing device.

17. The hearing aid system of claim 10,
wherein the processor of the communication device processes the audio signal based on the PAF file and a machine learning algorithm.

18. The hearing aid system of claim 10,
wherein the wireless communication terminal interfaces of the communication device and the terminal hearing device are configured as Bluetooth interface, in particular a Bluetooth Low Energy interfaces.

19. The hearing aid system of claim 10,
wherein the terminal hearing device comprises at least one earphone.

20. The hearing aid system of claim 10,
wherein the terminal hearing device comprises a first terminal hearing unit and a second terminal hearing unit.

21. The hearing aid system of claim 10,
wherein the terminal hearing device is an in-the-ear phone.

22. The hearing aid system of claim 10,
wherein the terminal hearing device comprises a first terminal hearing unit comprising a first communication terminal interface for a wireless communication link with the communication device, and wherein the first and second terminal hearing units comprise second communication terminals respectively for a wireless communication link between the first and second terminal hearing units.

23. The hearing aid system of claim 10,
wherein the communication device is a first communication device and is further configured for a communication connection to at least a second communication device, wherein the first communication device transmits the PAF file to the second communication device when the terminal hearing device forms a wireless communication link with the second communication device, or wherein the first communication device transmits the PAF file to the second communication device when the terminal hearing device forms a wireless communication link with the first communication device.

24. A non-transitory computer readable medium comprising instructions which, if executed by one or more processors, cause the one or more processors to:
determine, via a wireless communication link, a connection between a communication device and a terminal hearing device;
determine, in the memory of the communication device, a personal audibility feature (PAF) file comprising personal auditability feature of the user and audio reproduction feature of the terminal hearing device;
provide an audio stream, via the wireless communication link, from the communication device to the terminal hearing device, wherein the communication device provides the audio stream based on a digital audio signal, wherein the digital audio signal is associated with a received audio signal from a scene, determined using an audio source of the communication device, and processed based on information stored in the PAF file.

25. The non-transitory computer readable medium of claim 24,
wherein the personal auditability feature comprises a personal audibility curve, and the audio reproduction feature comprises information of a unique ID, a name, a network address and/or a classification of the predetermined terminal hearing device.

* * * * *